(12) United States Patent
Grimm et al.

(10) Patent No.: US 10,377,571 B2
(45) Date of Patent: Aug. 13, 2019

(54) CONVEYOR APPARATUS, SYSTEMS AND METHODS

(71) Applicant: Superior Industries, Inc., Morris, MN (US)

(72) Inventors: Lafe Grimm, Hancock, MN (US); David Denzer, Hancock, MN (US)

(73) Assignee: Superior Industries, Inc., Morris, MN (US)

( * ) Notice: Subject to any disclaimer, the term of this patent is extended or adjusted under 35 U.S.C. 154(b) by 0 days.

(21) Appl. No.: 15/710,224

(22) Filed: Sep. 20, 2017

(65) Prior Publication Data

US 2018/0079594 A1 Mar. 22, 2018

Related U.S. Application Data

(60) Provisional application No. 62/439,577, filed on Dec. 28, 2016, provisional application No. 62/397,329, filed on Sep. 20, 2016.

(51) Int. Cl.

| | |
|---|---|
| *B65G 13/11* | (2006.01) |
| *B65G 15/08* | (2006.01) |
| *B65G 21/00* | (2006.01) |
| *B65G 21/20* | (2006.01) |
| *B65G 39/12* | (2006.01) |

(52) U.S. Cl.
CPC .............. *B65G 13/11* (2013.01); *B65G 21/00* (2013.01); *B65G 21/2072* (2013.01); *B65G 39/12* (2013.01); *B65G 15/08* (2013.01); *B65G 2207/40* (2013.01)

(58) Field of Classification Search
CPC ........ B65G 21/00; B65G 21/02; B65G 21/08; B65G 21/2063; B65G 21/2072; B65G 13/11; B65G 39/12

USPC .................... 198/860.3, 836.1, 836.3, 836.4
See application file for complete search history.

(56) References Cited

U.S. PATENT DOCUMENTS 3,241,655 A * 3/1966 Lo Presti ............. B65G 39/145
198/828
3,430,756 A * 3/1969 Allendorf ............ B65G 39/145
198/828

(Continued)

FOREIGN PATENT DOCUMENTS

| CN | 202130843 U | 2/2012 |
|---|---|---|
| CN | 204433621 U | 7/2015 |
| CN | 205604842 U | 9/2016 |

OTHER PUBLICATIONS

Kee Saftey, "Safety Components Catalog", Buffalo, NY, copyright 2009, 52 pages.

(Continued)

*Primary Examiner* — Mark A Deuble
(74) *Attorney, Agent, or Firm* — Todd R. Fronek; Larkin Hoffman Daly & Lindgren, Ltd.

(57) ABSTRACT

Conveyor apparatus, systems and methods are provided. In some embodiments a rail is supported in spaced-apart relation from an idler assembly of the conveyor by a bracket mounted to the conveyor. In some embodiments the bracket is mounted (e.g., removably mounted such as by a clamp) to an idler assembly of the conveyor (e.g., an end stand thereof). In some embodiments a retractable idler support is slidably mounted to a base frame and advanced between a first and second position.

20 Claims, 19 Drawing Sheets

(56) References Cited

U.S. PATENT DOCUMENTS

| | | | | |
|---|---|---|---|---|
| 4,759,437 | A | * | 7/1988 | Bevins ............... B64F 1/32 182/113 |
| 5,029,697 | A | * | 7/1991 | McMillan ............ B65G 21/00 198/817 |
| 5,078,250 | A | | 1/1992 | Cole |
| 5,178,263 | A | * | 1/1993 | Kempen ............ B65G 21/02 198/836.1 |
| 5,423,418 | A | | 6/1995 | Furrow |
| 6,360,876 | B1 | | 3/2002 | Nohl et al. |
| 7,762,387 | B2 | | 7/2010 | Dunn |
| 8,028,814 | B1 | * | 10/2011 | Szalankiewicz ....... B65G 21/06 198/303 |
| 8,430,225 | B2 | | 4/2013 | Gausman et al. |
| 8,684,161 | B2 | | 4/2014 | Gausman et al. |
| 8,833,539 | B2 | | 9/2014 | Fehr et al. |
| 9,156,617 | B2 | | 10/2015 | Fehr et al. |
| 9,738,456 | B1 | | 8/2017 | Grimm et al. |
| 2007/0029170 | A1 | | 2/2007 | Anagnost |
| 2010/0072037 | A1 | * | 3/2010 | Jabber ............... B65G 15/00 198/842 |

OTHER PUBLICATIONS

Kee Safety, "Collective Fall Protection Solutions", Buffalo, NY, Jun. 2011, 10 pages.

Material Control, Inc., "Conveyor Safety PC-Stop Switch Bulletin", North Auror, IL, copyright 1992, 4 pages.

Superior Industries, "Basket Catch Guards" Equipment Operators Manual, Jan. 1, 2016, 1 page.

Superior Industries, "Basket Cage Return Guards" Equipment Operators Manual, May 15, 2001, 2 pages.

Superior Industries, "Conveyor Cover—1/2" Equipment Operators Manual, 2001, 3 pages.

Superior Industries, "Idler Installation" Equipment Operators Manual, Jun. 15, 2001, 2 pages.

* cited by examiner

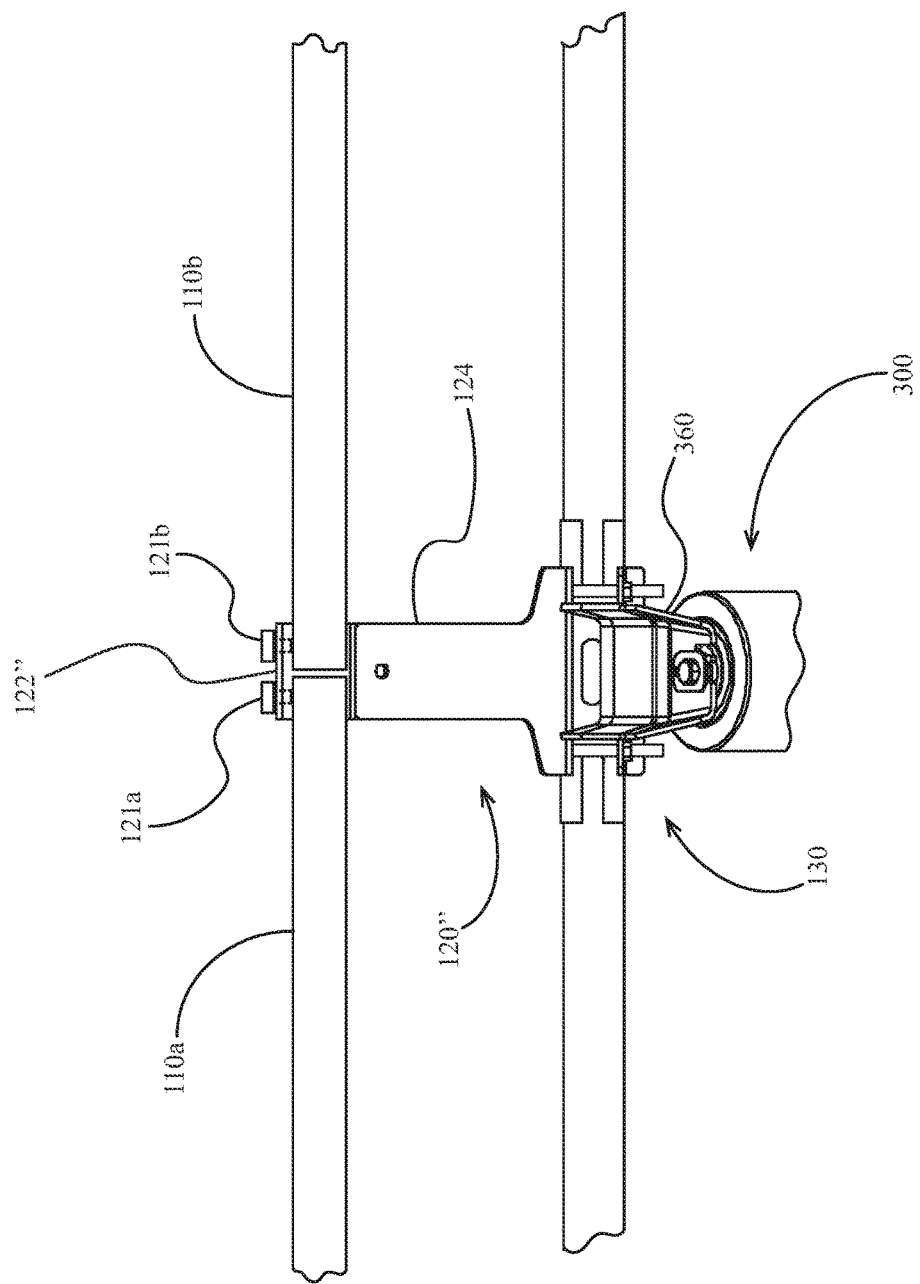

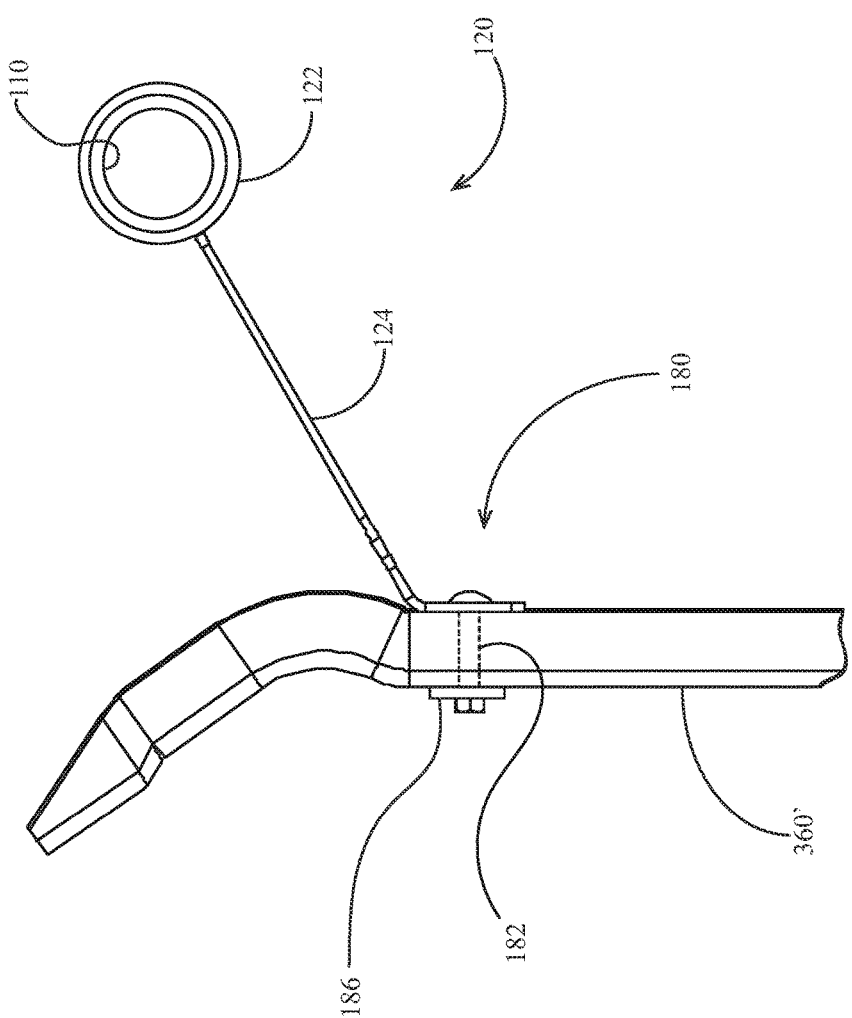

CONVEYOR APPARATUS, SYSTEMS AND METHODS

BACKGROUND

Conveyors such as belt conveyors are used to move material (e.g., aggregate material) in various industries.

BRIEF DESCRIPTION OF THE DRAWINGS

FIG. 18 is a partial plan view of another embodiment of a mounting bracket.

FIG. 19 is a side elevation view of an embodiment of a mounting assembly.

DESCRIPTION

Figure 1:
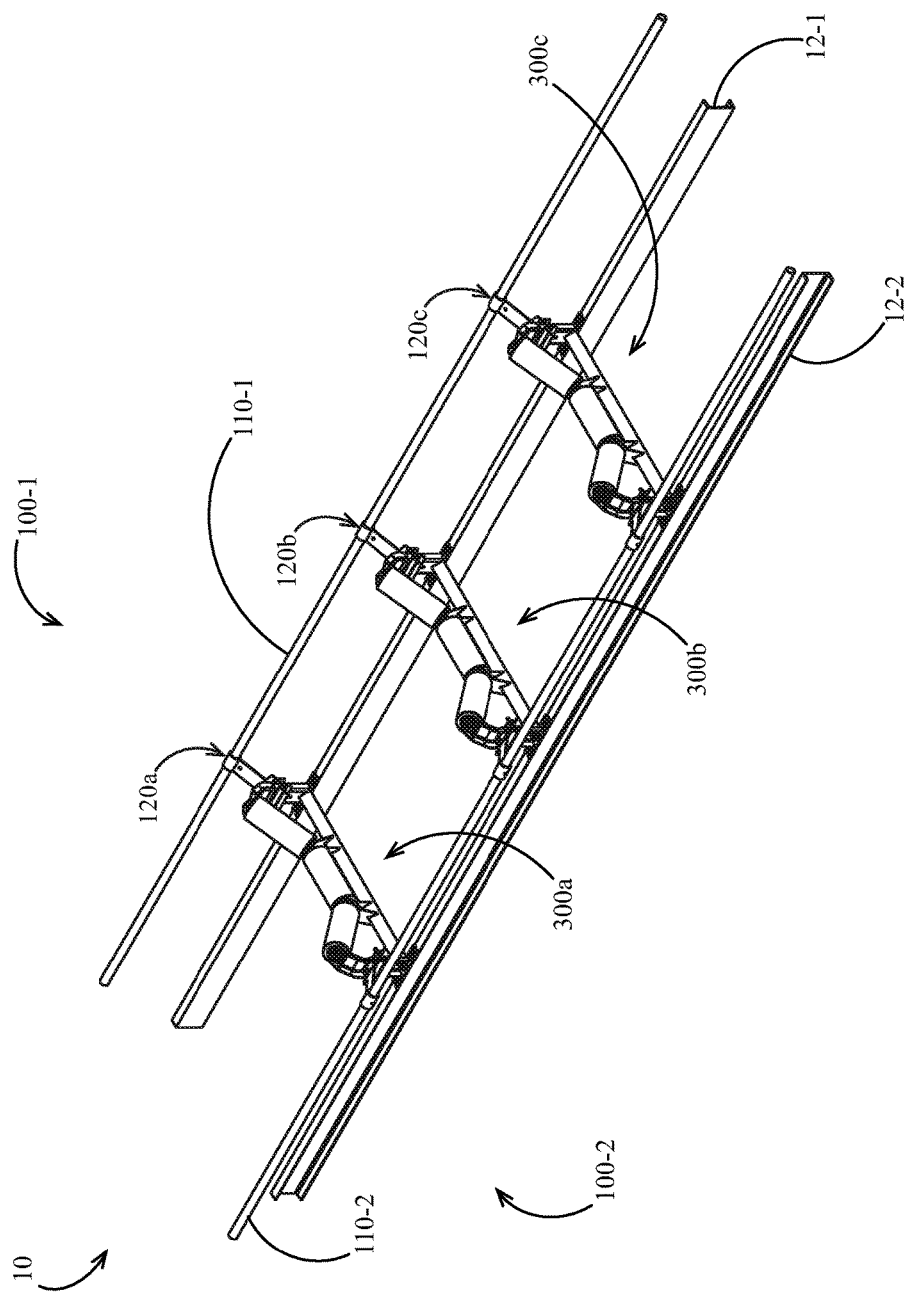
FIG. 1 is a perspective view of an embodiment of a belt conveyor.
Figure 2:
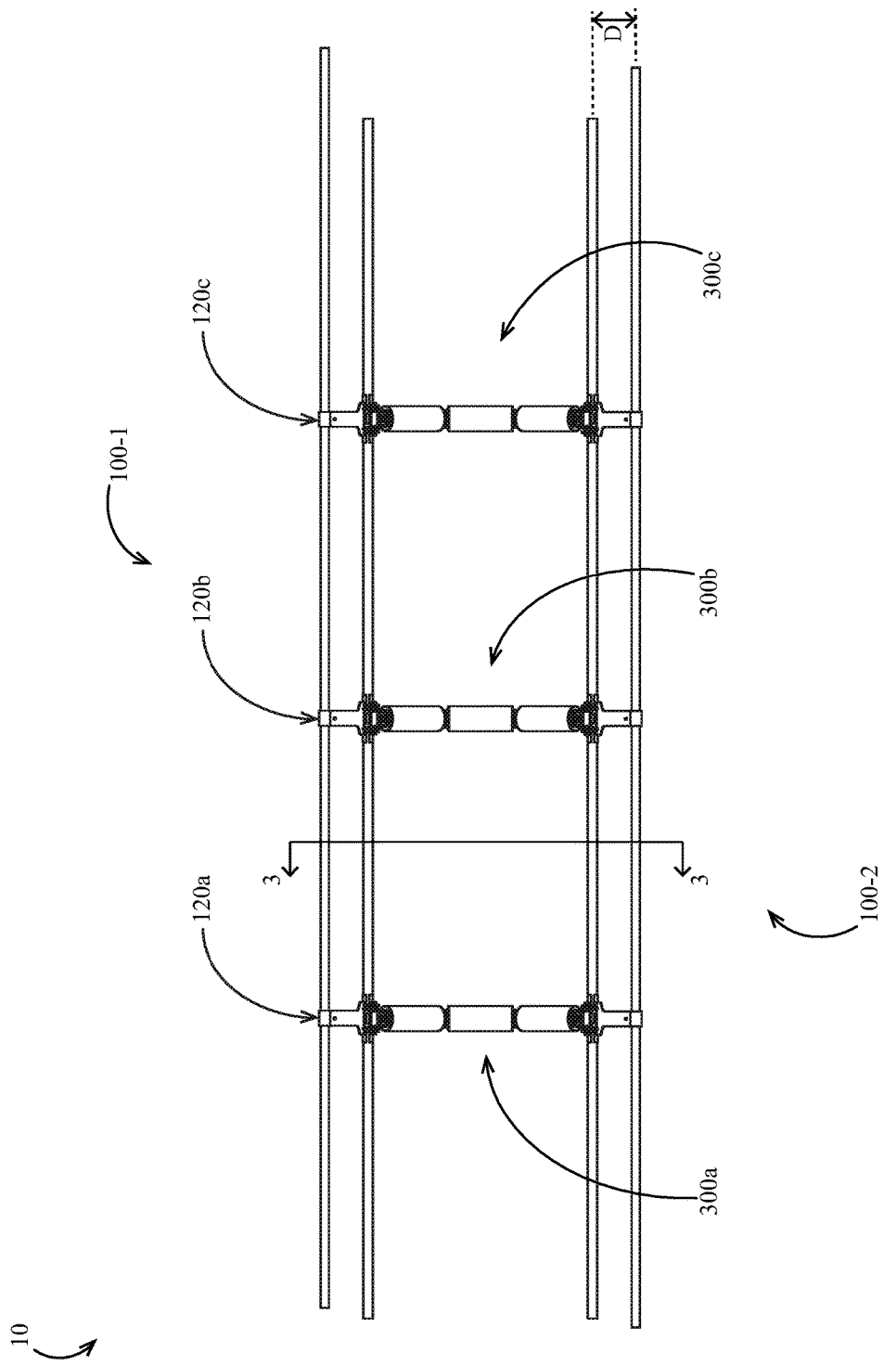
FIG. 2 is a plan view of the belt conveyor of FIG. 1.

Conveyor guard apparatus are disclosed. Some embodiments include a longitudinally extending rail. Some embodiments include a bracket configured to support the rail. Some embodiments include a clamp configured to removably secure the bracket to an idler roller assembly (e.g., to a riser thereof). In some embodiments, the rail is supported by a plurality of brackets supported by a plurality of idler roller assemblies (e.g., by risers thereof). In some embodiments, a retractable idler support is supported by a base frame.

Retractable and/or partially retractable idlers are disclosed. Some embodiments are retractable or partially retractable by turning a threaded rod or modifying a position or orientation of other structure.

Referring to the drawings, wherein like reference numerals designate identical or corresponding parts throughout the several views, FIGS. 1-4 illustrate an embodiment of a belt conveyor 10 and first and second guards 100-1, 100-2 optionally removably mounted to the belt conveyor 10. The belt conveyor 10 optionally comprises a plurality of idler roller assemblies 300 (e.g., 300a, 300b, 300c). Each idler roller assembly 300 is optionally supported by a first rail 12-1 (e.g., at a first transverse end thereof) and a second rail 12-2 (e.g., at a second transverse end thereof). The idler roller assemblies 300 optionally operably support a conveyor belt (not shown) resting on the idler roller assemblies; in operation, as the conveyor belt is advanced on top of the idler roller assemblies along a length of the belt conveyor 10 (e.g., along the travel direction T shown in FIG. 4), rollers of the idler roller assemblies roll to ease movement of the conveyor belt. The belt conveyor 10 optionally includes a head pulley (e.g., a driven head pulley driven by a motor such as an electric motor) and a tail pulley (e.g., an idler tail pulley) and further features and structures such as those described in U.S. Pat. Nos. 5,515,961 and/or 9,156,617, the entire disclosures of which are hereby incorporated by reference herein. In various embodiments, the belt conveyor 10 comprises various stationary and/or portable conveyors (e.g., folding conveyors, conveyors mounted to portable chassis, etc.), among others. In various embodiments, the belt conveyor 10 comprises various telescoping and/or fixed-length conveyors, among others. In other embodiments, the conveyor may comprise a type other than a belt-type conveyor (e.g., a chain conveyor).

Each guard 100 optionally extends at least partially along the length of the belt conveyor 10. Each guard 100 optionally comprises one or more rails 110 (e.g., having circular cross-section as illustrated or a rectangular, or other cross-section). Each rail 110 is optionally disposed transversely to one side of the idler roller assembly 300 at a transverse distance (e.g., the distance D shown in FIG. 2). In various embodiments, the transverse distance is greater than 3 inches, greater than 6 inches, between 6 and 12 inches, between 7 and 12 inches, between 7 and 10 inches, 7 inches, about 7 inches, 8 inches, about 8 inches, 9 inches, about 9 inches. In some embodiments, the transverse distance is optionally selected to conform to a safety standard and/or to mitigate contact of the assembly 300 or conveyor belt by a bystander or operator.

Figure 3:
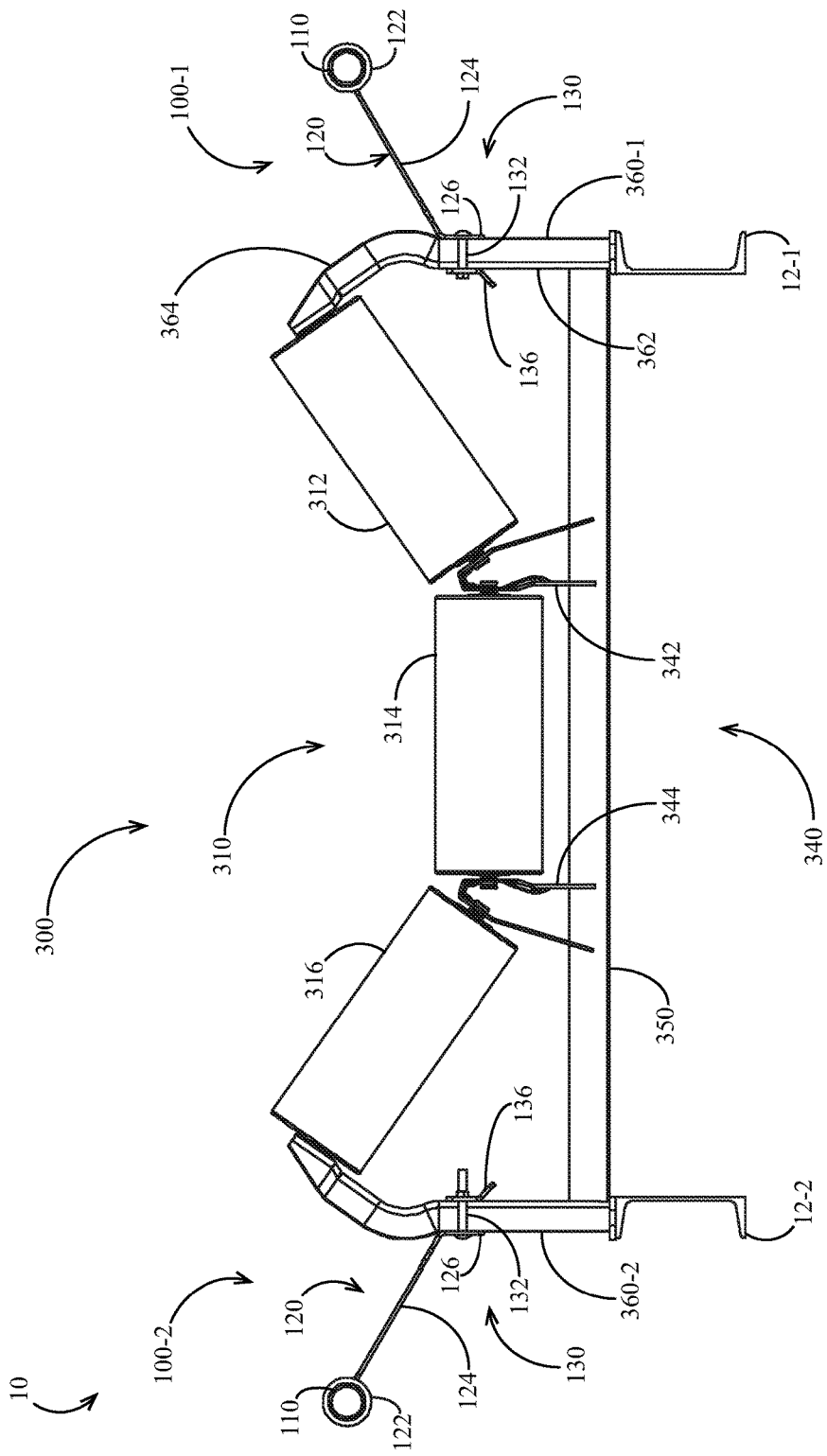
FIG. 3 is a sectional view along the section 3-3 of FIG. 2.

An exemplary embodiment of an idler roller assembly 300 is illustrated in FIG. 3. It should be appreciated that although the exemplary embodiment shown in FIG. 3 is a certain style of troughing or carry idler, in other embodiments the rail 110 and/or bracket 120 are supported by one of a garland, a flat carrier, wire rope, or a variable pitch idler, among others. In some embodiments, the rail 110 and/or bracket 120 are supported by a bottom or return idler. In various embodiments, the idler roller assembly may comprise one, two, three or more idler rollers which may be arranged in a symmetrical troughing fashion, in a non-symmetrical troughing fashion, or in a horizontal or parallel fashion.

The exemplary idler roller assembly 300 of FIG. 3 optionally comprises a first riser 360-1 and a second riser 360-2 optionally supported by (e.g., removably mounted to such as by fasteners) the rails 12-1, 12-2, respectively. Riser embodiments including those described herein may be referred to as stands, end stands, perch support, or by other terminology. The risers 360-1, 360-2 are optionally mounted to a transverse support 350 (e.g., to opposing ends thereof). Each riser 360 optionally extends generally upward from the associated rail 12. Each riser 360 optionally comprises a lower (optionally generally vertically-oriented) portion 362 and an upper portion 364 which optionally extends generally inwardly and upwardly from the lower portion 362. An idler arrangement 310 optionally includes a plurality of idler rollers 312, 314, 316 which are optionally arranged in a troughing configuration. Individual idler rollers of the idler arrangement 310 are optionally rollingly supported by the risers 360 and optionally rollingly supported by inboard support structure 340 which optionally comprises a first support 342 and second support 344.

In the illustrated embodiment, the idler roller 312 is optionally rollingly supported at an outboard end by riser 360-1 and is optionally rollingly supported at an inboard end by support 342. The idler roller 316 is optionally rollingly supported at an outboard end by riser 360-2 and is optionally rollingly supported at an inboard end by support 344. The idler roller 314 is optionally rollingly supported at a first end by support 342 and optionally rollingly supported at a second end by support 344.

Each rail 110 is optionally supported by one or more brackets 120. Each bracket 120 is optionally mounted (e.g., removably mounted) to a component of the belt conveyor 10. Each bracket 120 is optionally removably mounted to an associated riser 360 of the idler roller assembly 300. Each bracket 120 is optionally removably mounted to the riser 360 by a clamp 130 which removably secures the bracket to the riser. In alternative embodiments, the bracket 120 is alternatively or additionally bolted directly to the riser 360. In alternative embodiments, the bracket 120 and/or rail 110 are supported by other components of the belt conveyor 10 such as the rails 12. In some embodiments, the clamp 130 may comprise a U-bolt (e.g, square U-bolt) removably engaging the riser 360.

In some embodiments, each rail 110 is optionally supported by a plurality of brackets 120; each bracket 120 is optionally mounted to a riser 360 of one of a plurality of idler roller assemblies 300 (e.g., by one of a plurality of clamps 130). In some embodiments, three idler roller assemblies 300a, 300b, 300c cooperatively support the idler rails 110-1 to one transverse side of the belt conveyor 10.

Figure 4:
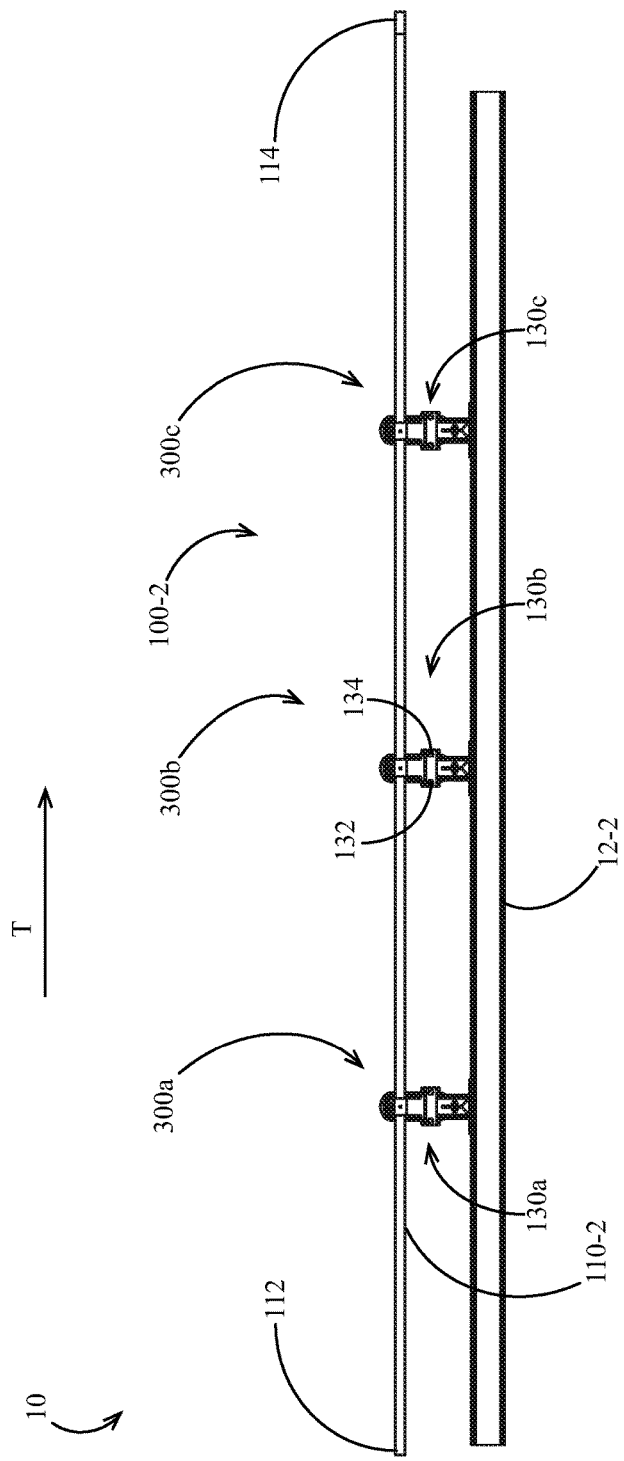
FIG. 4 is a side elevation view of the belt conveyor of FIG. 1.

In some embodiments, each rail 110 optionally comprises one of a plurality of rails extending along the length of the conveyor (e.g., longitudinally along the travel direction T). In some embodiments, multiple rails are disposed parallel to one another. In some embodiments, multiple rails are disposed adjacent to one another (e.g., with a longitudinal gap between them or contacting one another). With reference to FIG. 4, in some embodiments each rail comprises a first end 112 (e.g., a female end) having an inner diameter equal to or slightly greater than the outer diameter of a second end 114 (e.g., a male end); such rails may be coupled at respective first and second ends to form a continuous guard comprising a plurality of rails.

Figure 5:
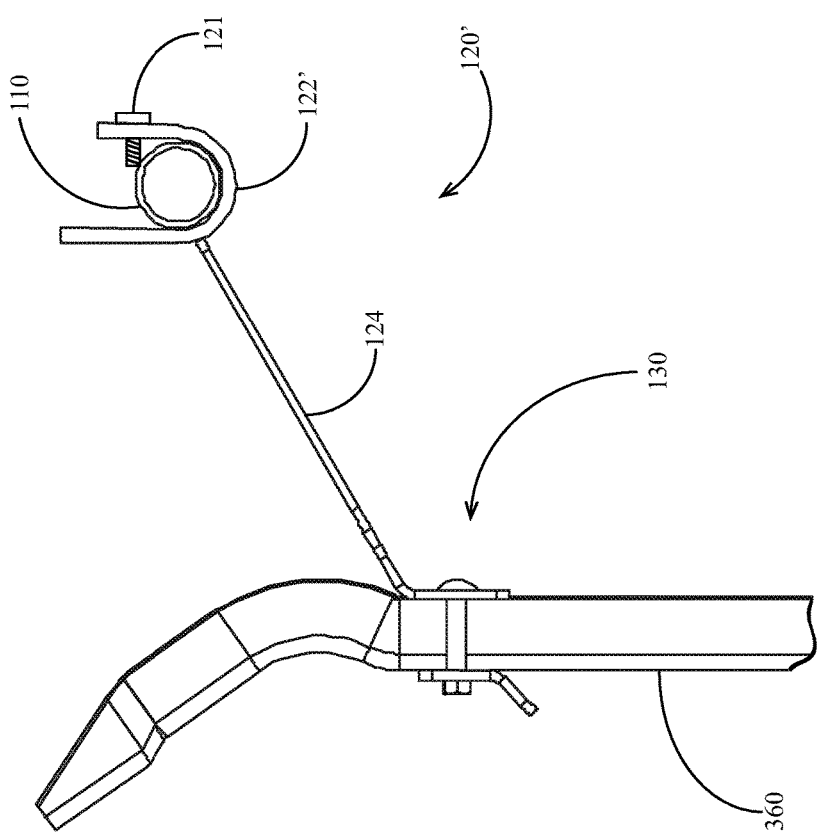
FIG. 5 is a front elevation view of an embodiment of a bracket.

In the embodiment of FIGS. 1-4, the bracket 120 comprises an arm 124 extending between a mount 26 and a rail support 122. In some embodiments, the rail support 122 comprises an opening (e.g., a circular opening) through which the rail 110 is inserted along the length of the conveyor during installation. In other embodiments (such as that illustrated in FIG. 5), an embodiment of a rail support 122' comprises an open upper end in which the rail 110 is placed during installation and optionally secured by a fastener 121 such as a bolt.

The arm 124 optionally comprises a plate and is optionally disposed at an angle relative to (e.g., above) horizontal such as between 30 and 60 degrees above horizontal. The arm 124 is optionally mounted to the rail support 122 (e.g., by welding) and in alternative embodiments is formed as a part with the rail support. The mount 126 is optionally mounted to or formed as a part with the arm 124 and may be described as an arm mount or mounting portion of the arm 124. The mount 126 optionally comprises a plate which optionally has one or more openings for removably attaching the clamp 130.

The clamp 130 optionally comprises one or more fasteners such as nut-and-bolt assemblies (e.g., fasteners 132, 134) disposed rearward and forward of the riser 360. The clamp 130 optionally comprises an inner mount 136 (e.g., a plate or other suitable structure). The inner mount 136 optionally engages the riser 360 (e.g., an inboard surface thereof). The fastener 132 (and/or fastener 134) optionally engages the inner mount 136 such that tightening the fasteners 132 and/or 134 moves the inner mount 136 and mount 126 toward one another such that the clamp engages the riser, securing the position (e.g., vertical position) of the bracket 120 (e.g., by frictional contact between the clamp 130 and the riser 360).

In some embodiments a single bracket supported on a riser may support a plurality of (e.g., two) rails. The rails may be supported at first ends thereof by the single bracket and supported opposing ends thereof by additional brackets (which may also be supported on risers) or other structure. Referring to FIG. 18, a bracket 120" includes a rail support 122" which receives at least a portion (e.g., end portion) of rails 110a and 110b. The bracket 120" optionally includes a set screw 121a or other fastener for securing (e.g., releasably securing) the rail 110a to the bracket 120". The bracket 120" optionally includes a set screw 121b or other fastener for securing (e.g., releasably securing) the rail 110b to the bracket 120". The rail support 122 is optionally open (e.g., upwardly open) or of a closed (e.g., circular or elliptical) cross-section. In some embodiments, a single set screw or other fastener may be used to secure rails 110a, 110b to the bracket 120". In some embodiments, the rail or rails include openings for inserting a fastener therethrough for securement to the bracket.

Referring to FIG. 19, in some embodiments an alternative attachment structure or assembly such as mounting assembly 180 may mount (e.g., removably mount) the bracket to the riser. The mounting assembly 180 optionally includes a fastener 182 (e.g., bolt) which may extend through an opening provided in riser 360'. A washer 186 is optionally positioned between a head of bolt 182 and the riser 360'.

In some embodiments a bracket such as the brackets 120, 120' described herein may be fixedly attached to (e.g., formed as a part with, welded to, etc.) a riser 360.

Idler Assembly Embodiments

Figure 6:
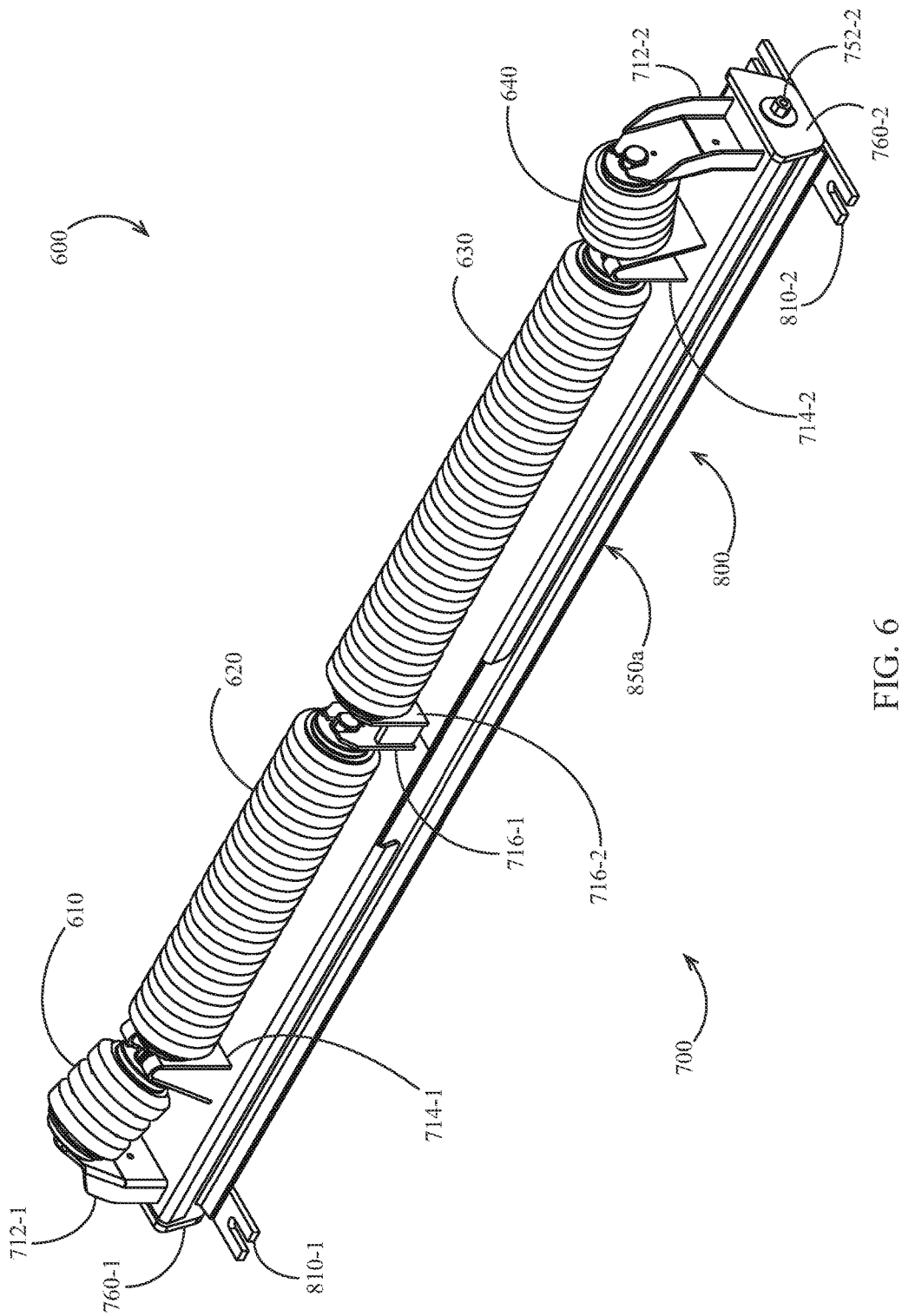
FIG. 6 is a perspective view of an embodiment of a conveyor idler assembly including an embodiment of an idler frame and an embodiment of a plurality of idler rollers.
Figure 7:
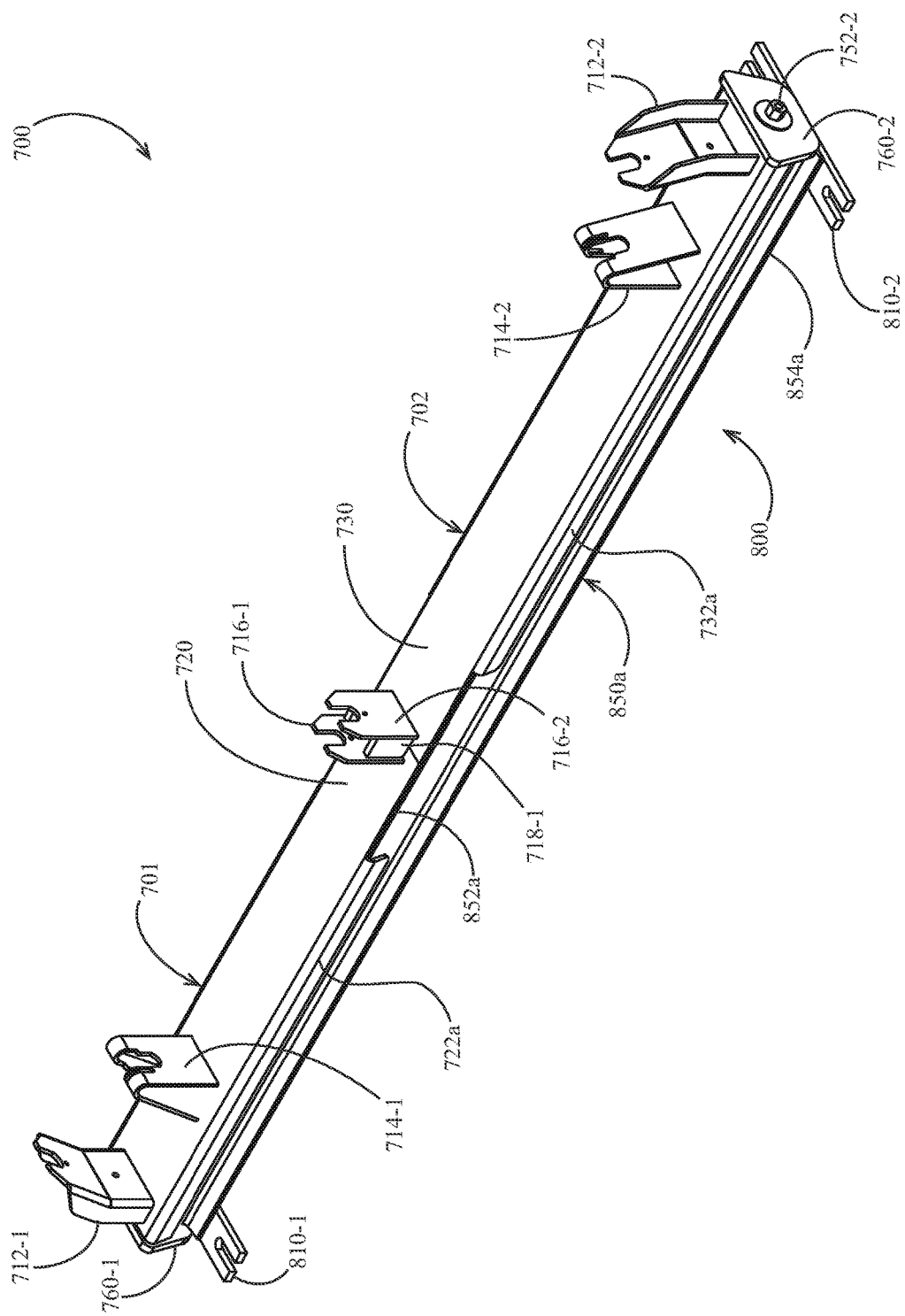
FIG. 7 is a perspective view of the idler frame of FIG. 6.
Figure 8:
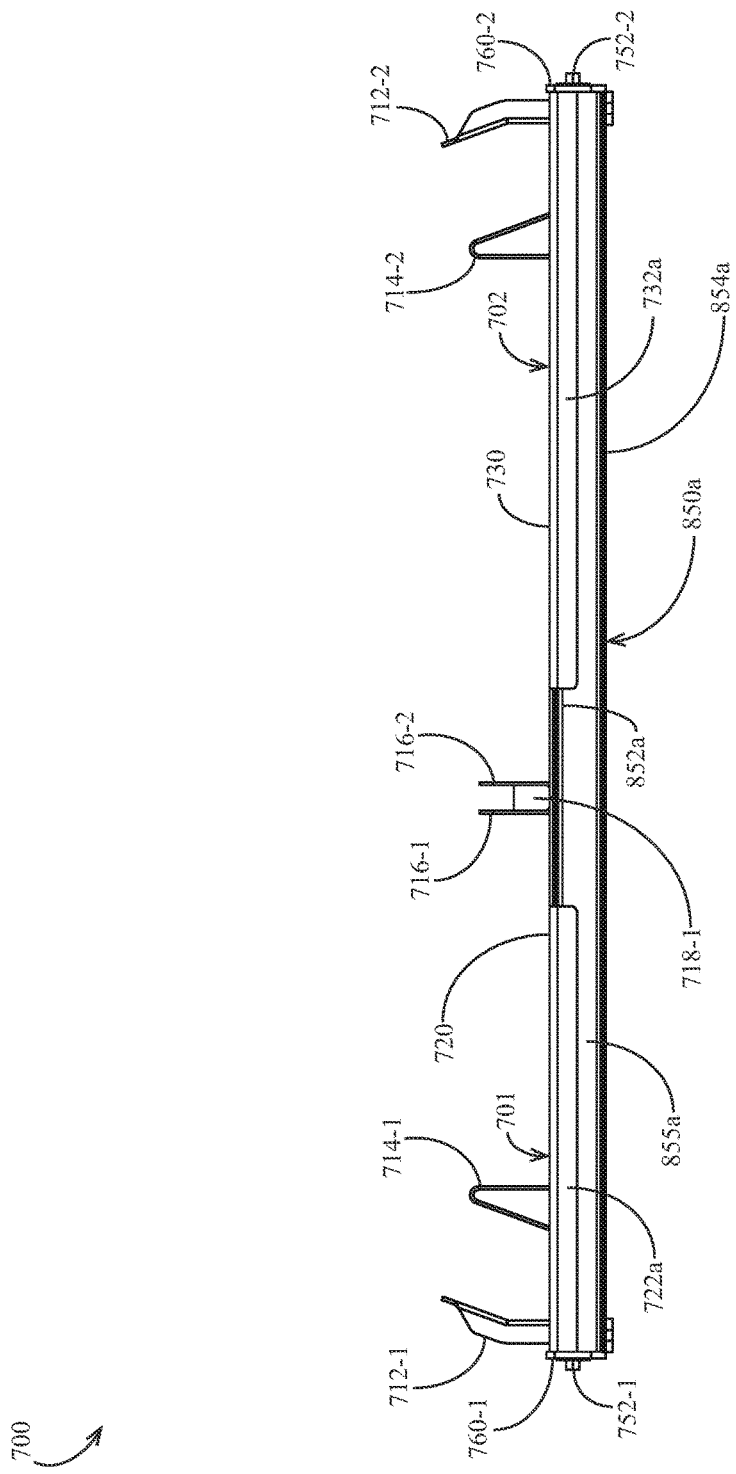
FIG. 8 is a front elevation view of the idler frame of FIG. 6.

Referring to FIGS. 6 and 7, an embodiment of an idler assembly 600 is illustrated. The idler assembly 600 is illustrated supporting a plurality of idler rolls; in other embodiments, the idler assembly additionally or alternatively supports one or more skids. Idler rolls and other structure which optionally supported by the idler assembly according to various embodiments may include metal idlers, plastic (e.g., HDPE) idlers, troughing (e.g., equal, unequal, offset or channel mount low profile) idlers, feeder or picking idlers, self-aligning idlers, variable pitch idlers, v-return idlers, beater bars, return rolls, flat carrier idlers, wire rope idlers, life shaft rollers, etc. The idler assembly 600 is illustrating supporting idler rolls on stands; in other embodiments, the idler assembly additionally or alternatively supports idler rolls on carry garlands or other structure.

The idler assembly 600 optionally comprises a first retractable idler support 701 slidably mounted to a base frame 800. The idler assembly 700 optionally comprises a second retractable idler support 702 slidably mounted to the base frame 800.

The retractable idler support 701 optionally includes a base 720. Idler supports such as end stand 712-1, center stand 714-1, and center support 716 are optionally mounted (e.g., by welding) to the retractable idler support 701 (e.g., to the base 720). An outer idler 610 is optionally rollingly supported on the end stand 712-1 and the center stand 714-1. An inner idler 620 is optionally rollingly supported on the center stand 714-1 and on the center support 716. The retractable idler support 702 optionally includes a base 730. Idler supports such as end stand 712-2, center stand 714-2, and center support 716 are optionally mounted (e.g., by welding) to the retractable idler support 702 (e.g., to the base 730). An outer idler 640 is optionally rollingly supported on the end stand 712-2 and the center stand 714-2. An inner idler 630 is optionally rollingly supported on the center stand 714-2 and on the center support 716. In some examples, a shaft of each idler is supported in a slot or other opening formed in the associated stand or support.

Figure 13:
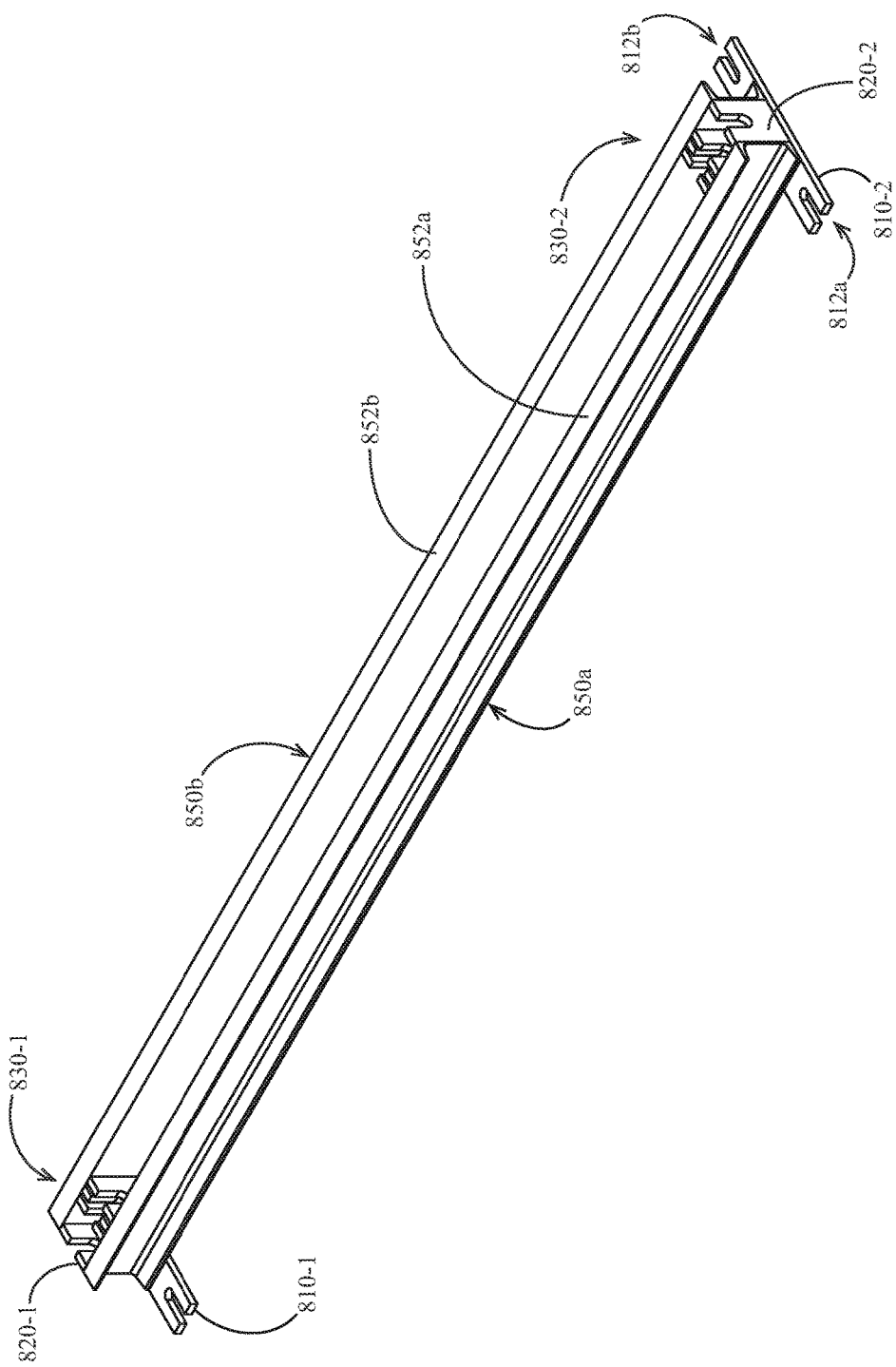
FIG. 13 is a perspective view of an embodiment of a base frame.
Figure 14:
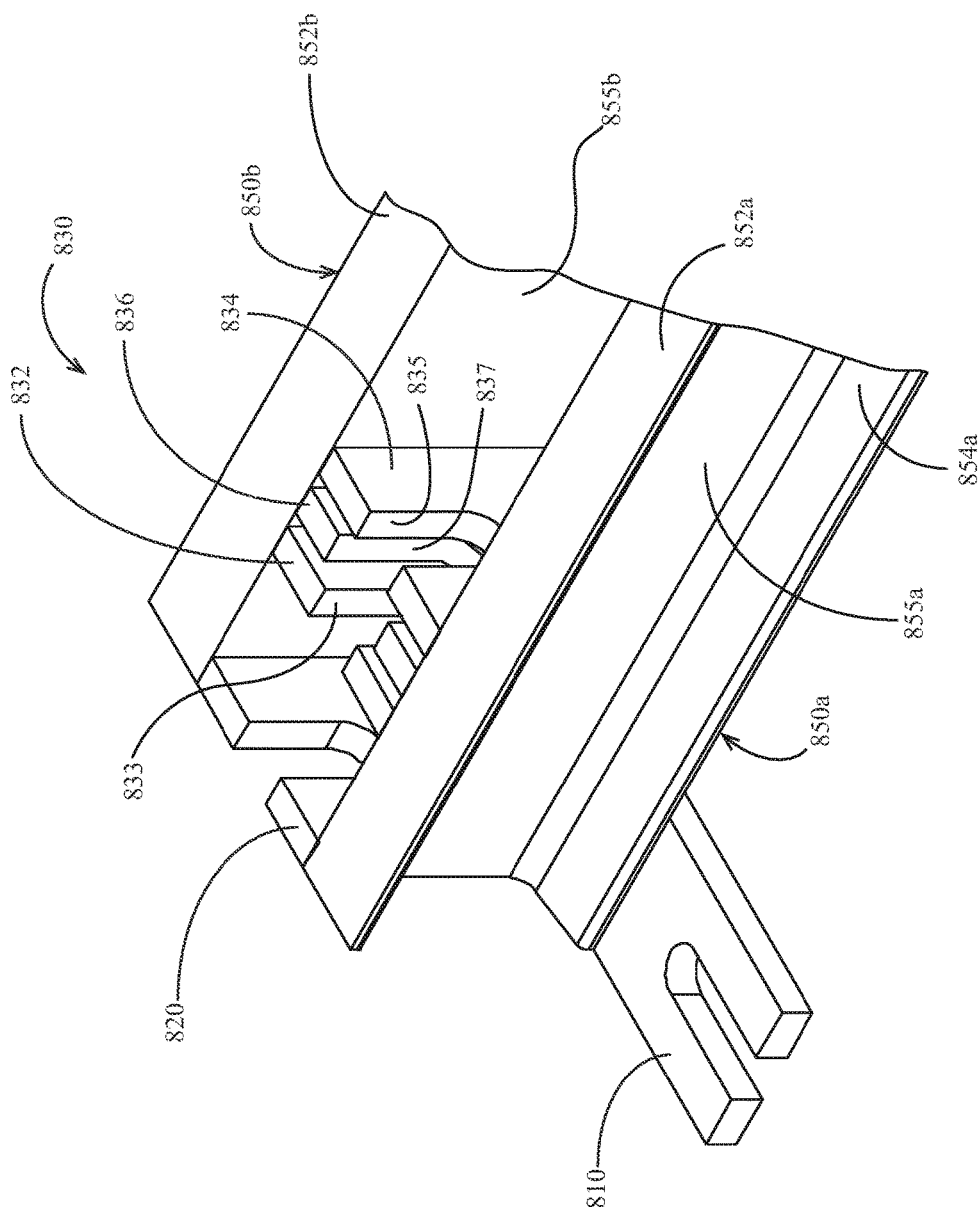
FIG. 14 is an enlarged partial perspective view of the base frame of FIG. 13.
Figure 15:
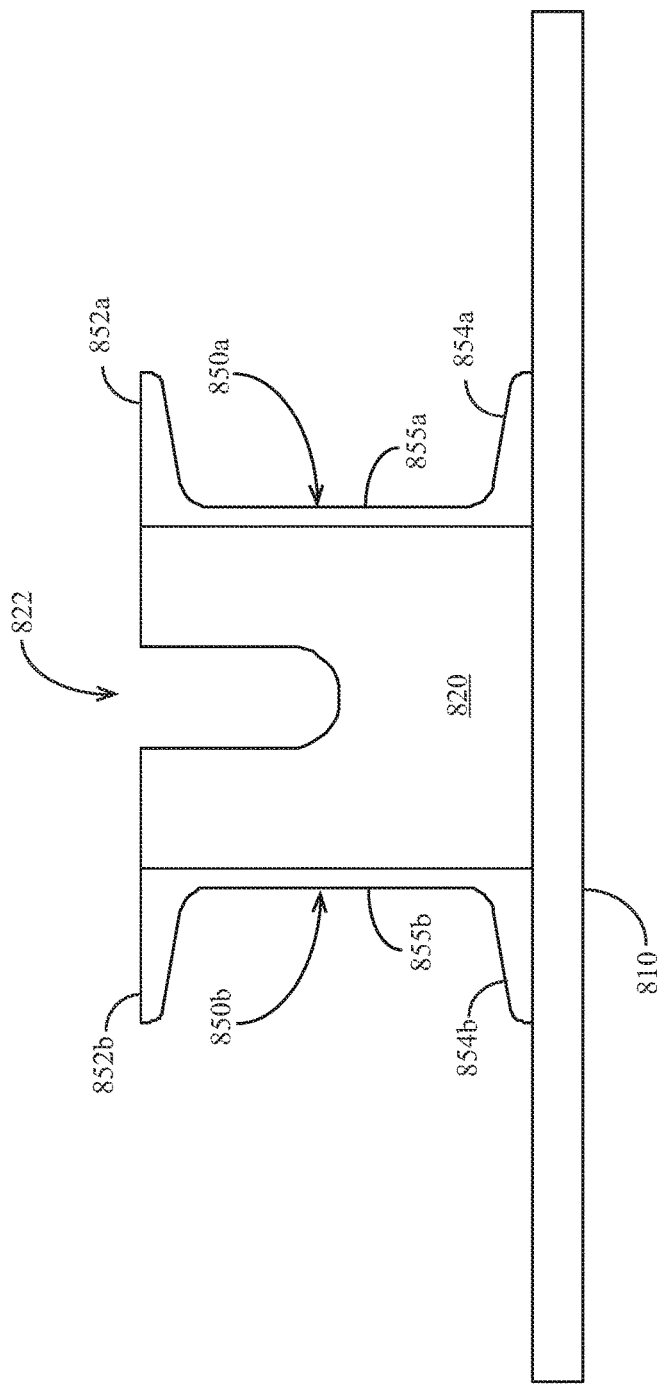
FIG. 15 is a side elevation view of the base frame of FIG. 13.

Referring to FIGS. 13, 14, and 15, the base frame 800 optionally comprises a forward support 850a and rear support 850b. In some embodiments, each support 850a, 850b comprises a beam; in other embodiments, the forward and rear supports comprise portions of a unitary structure such as a single tube or beam. Each support 850 optionally comprises a wall 855, an upper lip 852, and/or a lower lip 854. Each support 850 is optionally mounted (e.g., by welding) at a first end to a base mount 810-1 and at a second end to a base mount 810-2. The base mounts 810-1, 810-2 are optionally mounted to rails 12 (e.g., to rails 12-1, 12-2, respectively). Each base mount 810 is optionally configured to be removably mounted to the rails 12; for example, each base mount 810 optionally includes forward and rearward notches 812a, 812b (or other openings) for removably securing the base mount to a rail 12 with a bolt or other fastener (not shown).

The base frame 800 optionally comprises a first outer wall 820-1 and a second outer wall 820-2. The wall optionally comprises a notch 822 (e.g., an upwardly-facing notch) or other opening optionally sized to receive a rod therethrough.

The base frame 800 optionally comprises a first nut support 830-1 disposed on a first side thereof and a second nut support 830-2 disposed on a second side thereof. Each nut support 830 optionally comprises a wall 836. The wall 836 optionally comprises a notch 837 (e.g., an upwardly-facing notch) or other opening which is optionally configured to support a nut. For example, the notch may comprise a plurality of angled lower surfaces configured to restrict a nut from rotating relative to the wall 836.

Each nut support 830 optionally comprises walls 832, 834 disposed laterally on either side of the wall 836. The wall 832 optionally comprises a notch 833 (e.g., an upwardly-facing notch) or other opening which is optionally sized to receive a rod there through. The wall 834 optionally comprises a notch 835 (e.g., an upwardly-facing notch) or other opening which is optionally sized to receive a rod there through. The notch 837 is optionally wider (e.g., along a direction extending between supports 850a, 850b) than the notches 833 and/or 835.

Some or all of the walls 820, 832, 834 are optionally mounted (e.g., by welding) to the support 850a and/or the support 850b. In some embodiments, some or all of the walls 820, 832, 834 are mounted (e.g., by welding) to walls 855a and/or 855b. In some embodiments, the walls 820, 832, 834 are disposed perpendicular to the walls 855a and/or 855b.

The wall 836 is optionally mounted (e.g., by welding) to the support 850a and/or the support 850b. In some embodiments, the wall is mounted (e.g., by welding) to walls 855a and/or 855b. In some embodiments, the wall 836 is disposed perpendicular to the walls 855a and/or 855b.

Figure 9:
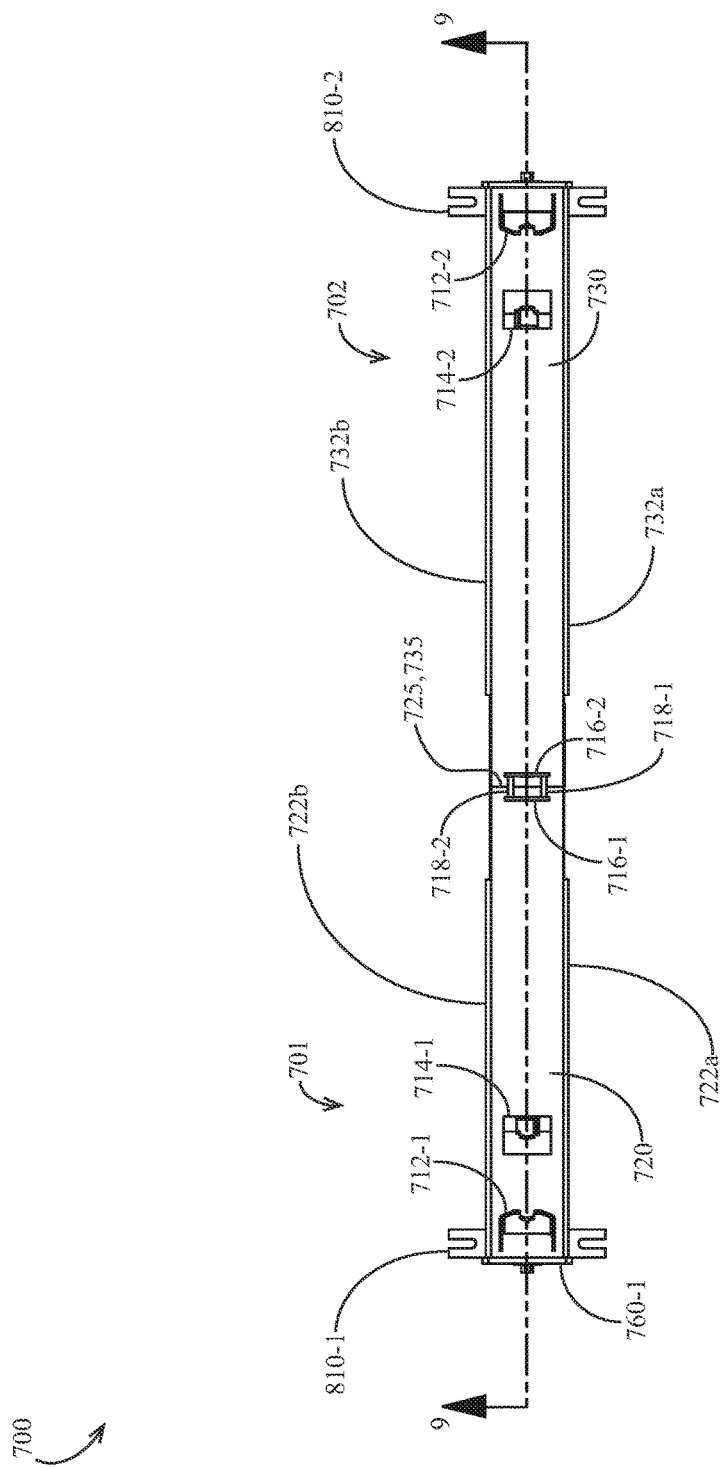
FIG. 9 is a plan view of the idler frame of FIG. 6.

Referring to FIGS. 7, 9, and 13, the retractable idler support 701 is optionally slidingly engaged with the base frame 800. For example, in some embodiments the retractable idler support 701 includes inwardly angled lips 722a, 722b which extend around the upper lips 852a, 852b, respectively. The lips 722 can optionally be fixed to (e.g., formed as a part with or welded to) the base 720. The engagement of lips 722 with lips 852 optionally allows lateral movement of the retractable idler support 701 with respect to the base frame 800. The engagement of lips 722 with lips 852 optionally restricts vertical movement (e.g., lifting, upward vertical movement, etc.) of the retractable idler support 701 with respect to the base frame 800.

The retractable idler support 702 is optionally slidingly engaged with the base frame 800. For example, in some embodiments the retractable idler support 702 includes inwardly angled lips 732a, 732b which extend around the upper lips 852a, 852b, respectively. The lips 732 can optionally be fixed to (e.g., formed as a part with or welded to) the base 730. The engagement of lips 732 with lips 852 optionally allows lateral movement of the retractable idler support 702 with respect to the base frame 800. The engagement of lips 732 with lips 852 optionally restricts vertical movement (e.g., lifting, upward vertical movement, etc.) of the retractable idler support 702 with respect to the base frame 800.

Referring to FIG. 9, the bases 720, 730 optionally include inboard edges 725, 735, respectively. In an installed configuration (e.g, when the retractable idler supports 701, 702 are installed on the base frame), the edges 725, 735 optionally contact and/or are adjacent to one another. A stop 718 (e.g., a gusset and/or plate) is optionally mounted (e.g., by welding) to each center support 716 (e.g., an inboard surface thereof). In the installed configuration, the stop 718 of each retractable idler support optionally contacts the center support 716 of the other retractable idler support. In the installed configuration, the stop 718 of each retractable idler support optionally extends past the edge of the base of the other retractable idler support and optionally restricts upward movement of the base of the other retractable idler support.

Figure 10:
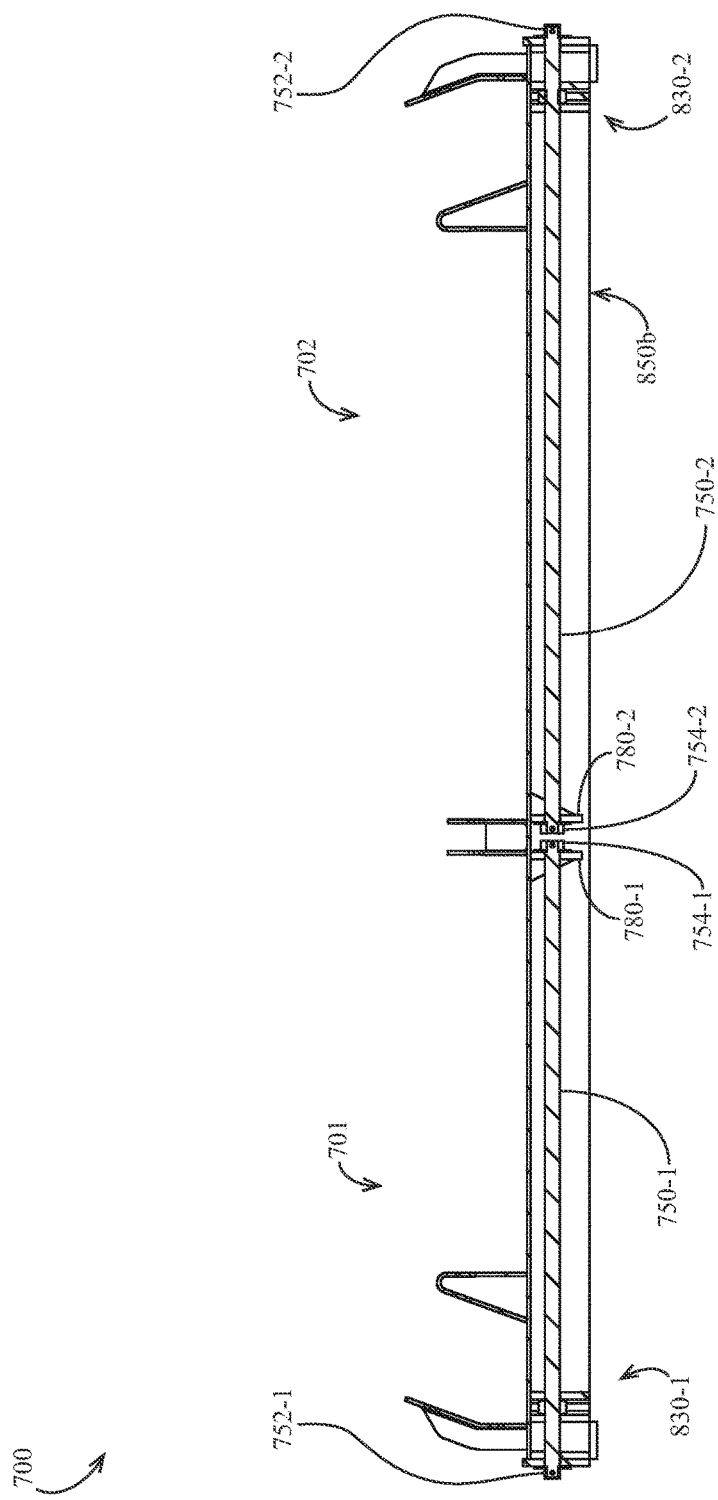
FIG. 10 is a sectional view of the idler frame of FIG. 6 along section 10-10 of FIG. 9.
Figure 11:
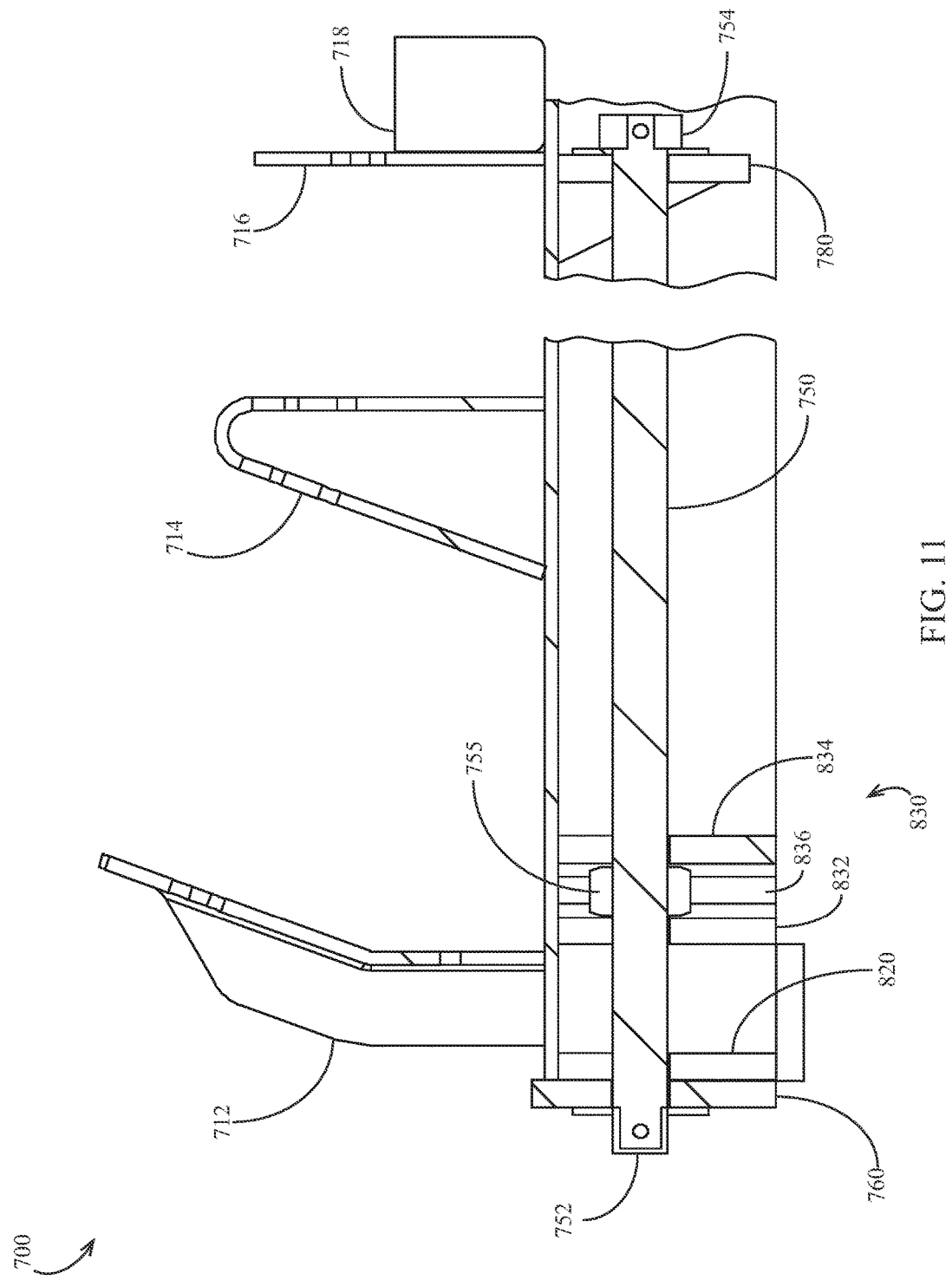
FIG. 11 is an enlarged partial view of the idler frame of FIG. 6 along section 10-10 of FIG. 9.
Figure 12:
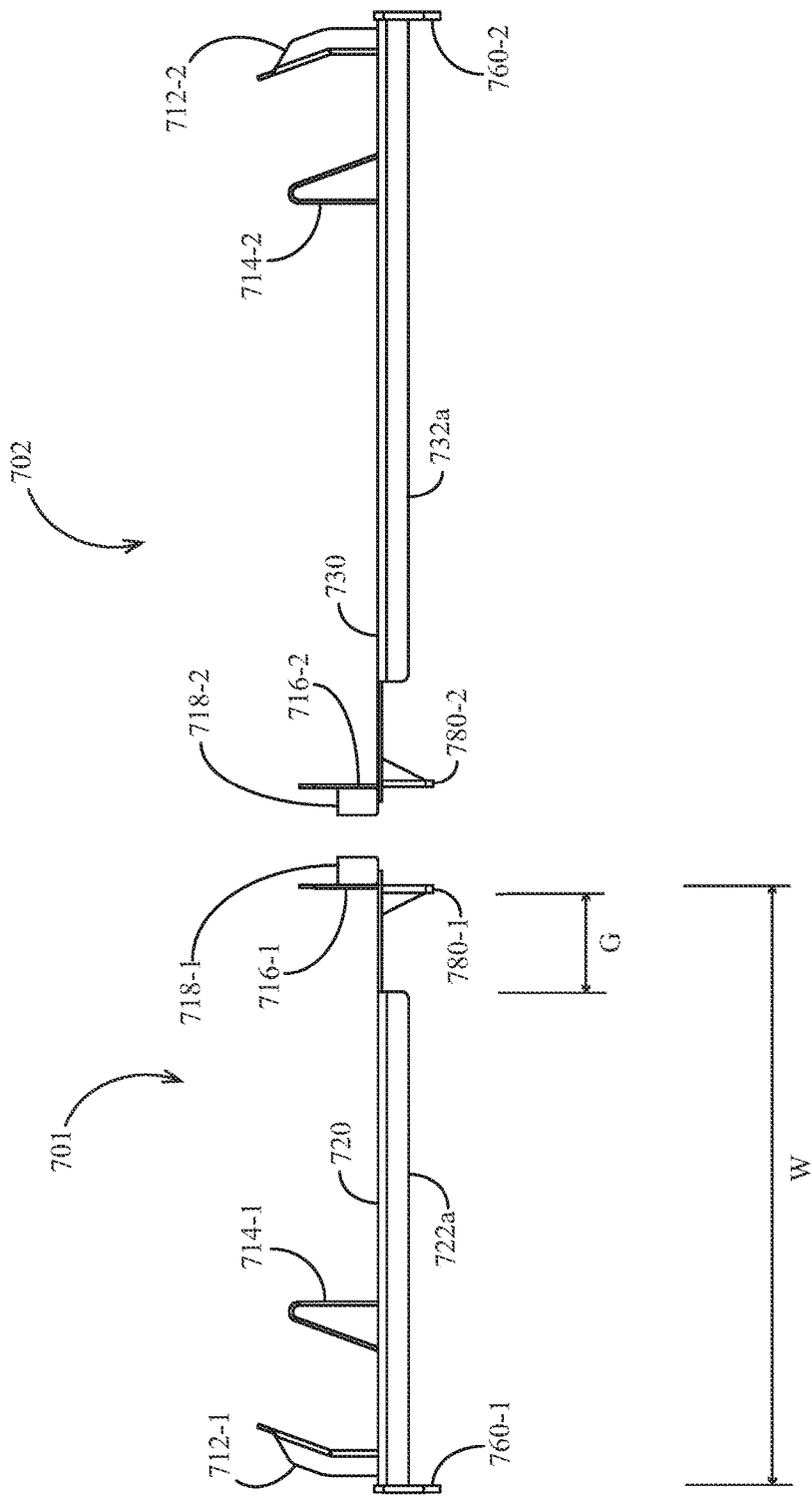
FIG. 12 is a front elevation view of an embodiment of a first retractable idler support and an embodiment of a second retractable idler support.

Referring to FIGS. 10 and 11, each retractable idler support 701, 702 optionally includes a threaded rod 750 (e.g., an Acme rod). The rod 750 is optionally in threaded engagement with a nut 755 which is optionally removably supported by the nut support 830. Each retractable idler support optionally includes an outboard cover 760 which is optionally mounted (e.g., by welding) to the base 730. In the installed configuration, the outboard cover 760 is optionally parallel to and/or optionally contacts the outer wall 820 of the base frame. The rod 750 is optionally rotatably supported at an outboard end by the outboard cover 760; for example, a fastener 752 such as a nut and washer optionally pivotally couples the rod 750 to the outboard cover 760 and optionally restricts translational movement of the rod 750 relative to outboard cover 760.

The rod 750 optionally extends through the nut support 830; for example, the rod 750 optionally extends through the notches in walls 832, 834, 836. The nut 755 is optionally removably supported by the nut support 830; for example, the nut 755 optionally rests in the notch 837 and is optionally restricted from translational movement by the walls 832, 834. The nut 755 is optionally in contact engagement with angled surfaces of the notch 837 such that the nut 755 is restricted from rotating relative to the nut support 830.

Each retractable idler support optionally includes an inboard wall 780 which is optionally mounted (e.g., by welding) to a lower surface of the base 730. In the installed configuration, the inboard wall 780 is optionally disposed between the supports 850*a*, 850*b* of the base frame. The rod 750 is optionally rotatably supported at an inboard end by the inboard wall 780; for example, a fastener 754 such as a nut and washer optionally pivotally couples the rod 750 to the inboard wall 780 and optionally restricts translational movement of the rod 750 relative to inboard wall 780.

Figure 16:
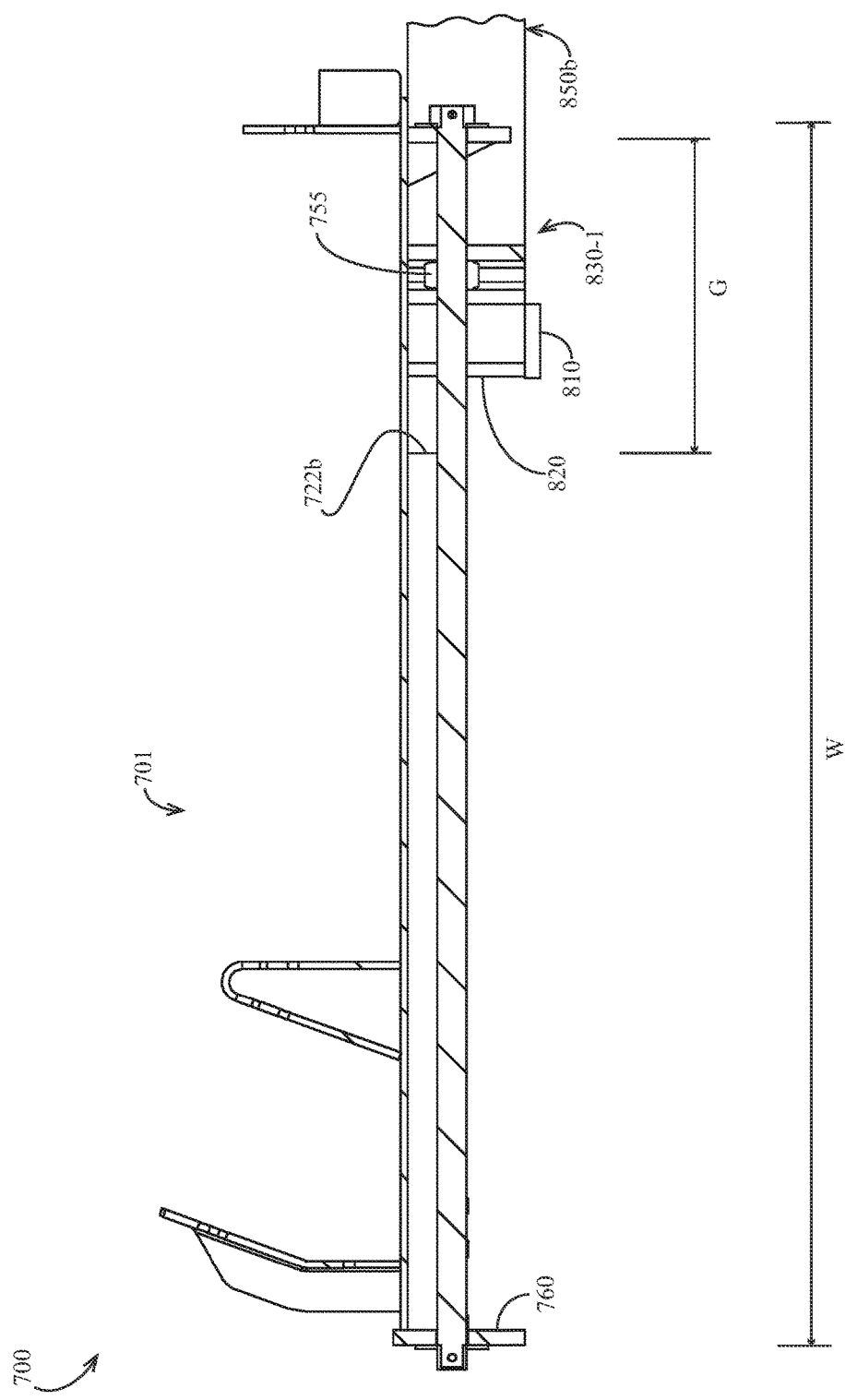
FIG. 16 is an enlarged partial view of the idler frame of FIG. 6 in a retracted configuration along section 10-10 of FIG. 9.

Comparing the installed configuration illustrated in FIG. 11 to the retracted configuration, illustrated in FIG. 16, rotation of the rod 750 (e.g., by turning fastener 752) optionally causes rod 750 to rotate relative to the nut 755 and thus be displaced in an outboard direction. Outboard displacement of the rod 750 optionally retracts the retractable idler support from the installed configuration to the retracted configuration. In an installation phase, the rod 750 may be turned in the opposite direction in order to displace the rod 750 in the inboard direction in order to advance the retractable idler support into the installed configuration.

Figure 17:
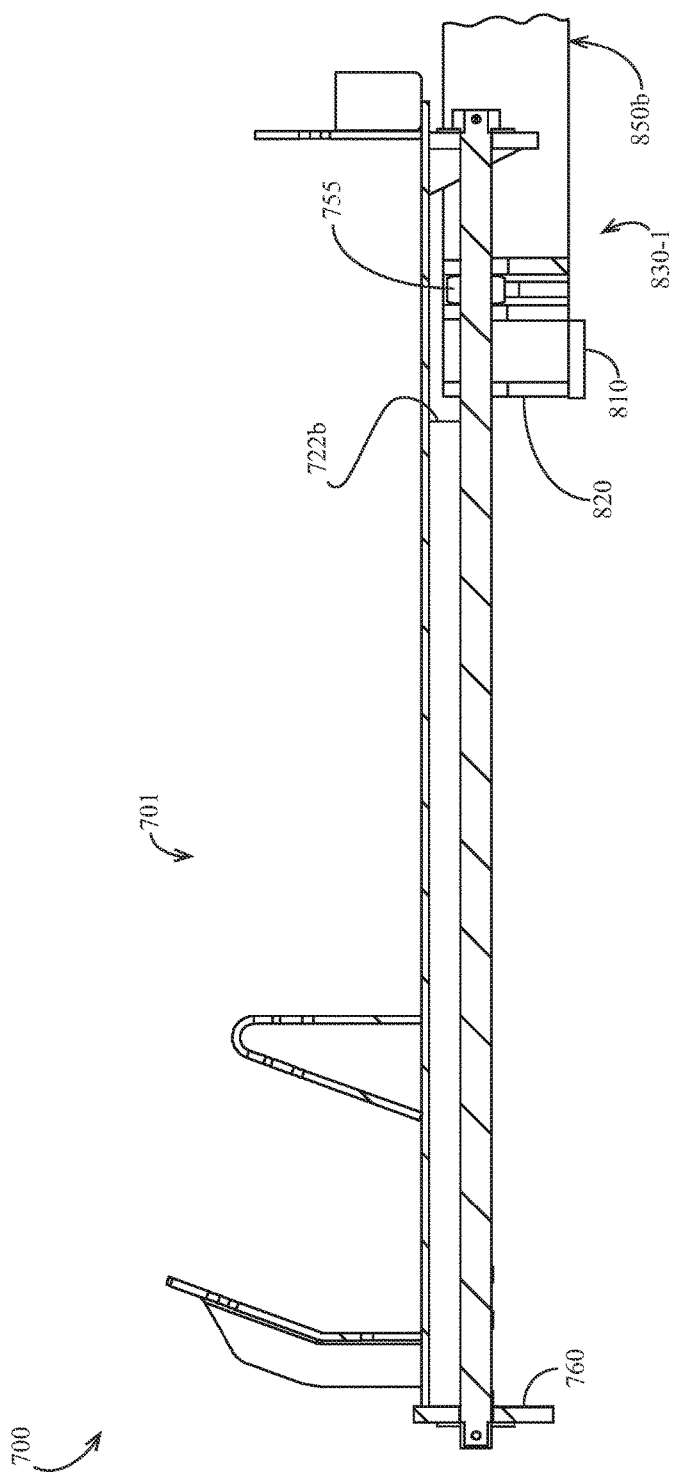
FIG. 17 is an enlarged partial view of the idler frame of FIG. 6 in a partially removed configuration along section 10-10 of FIG. 9.

Comparing FIG. 16 to FIG. 17, the retractable idler support is optionally removable (e.g., by lifting) from the base frame 800 in the retracted configuration. The open upper ends of notches in the nut support 830 optionally allow the nut 755 and rod 750 to be removed (e.g., lifted from) the nut support 830. The open upper end of notch 822 in outer wall 820 optionally allows the rod 750 to be removed (e.g., lifted from) the nut support 830. A gap G between the inboard ends of the lips (e.g., lips 722 or 732) and the inboard edge of the base (e.g., base 720 or 730) is optionally sized such that the lips are disengaged from the base frame 800 in the retracted configuration. The gap G is optionally wider than the nut 755. The gap G is optionally wider than the nut support 830. The gap G is optionally between one third and one fourth of the overall width W of the retractable idler support.

In some embodiments, the retractable idler supports 701 and 702 are identical in function and/or configuration, including being retractable between installed and retracted configurations relative to the base frame 800. In some embodiments, the bases 720, 730 are of different widths.

In some embodiments, a removable guard described herein may be mounted to an end stand of a retractable idler described herein.

Any ranges recited herein are intended to inclusively recite all values within the range provided in addition to the maximum and minimum range values. Headings used herein are simply for convenience of the reader and are not intended to be understood as limiting or used for any other purpose.

Although various embodiments have been described above, the details and features of the disclosed embodiments are not intended to be limiting, as many variations and modifications will be readily apparent to those of skill in the art. Accordingly, the scope of the present disclosure is intended to be interpreted broadly and to include all variations and modifications within the scope and spirit of the appended claims and their equivalents. For example, any feature described for one embodiment may be used in any other embodiment.

The invention claimed is:

1. A conveyor guard removably supportable on a belt conveyor idler assembly having a base frame, an end stand supported by and extending from the base frame and at least one idler roll supported on the end stand, the conveyor guard comprising:
   a longitudinally extending rail;
   a bracket configured to support said rail, said bracket comprising:
      an arm;
      a rail support positioned at a first end of said arm;
      an arm mount positioned at a second end of said arm; and
   a clamp configured to removably secure said arm mount to the end stand, wherein said first and second ends of said arm are spaced apart such that said arm is configured to extend generally upwardly and outwardly away from the idler roll such that said rail is positioned above said clamp when said clamp is secured to the end stand.

2. The conveyor guard of claim 1, wherein said arm mount is configured to engage an outer surface of the end stand, and wherein said clamp comprises:
   an inner mount configured to engage an inner surface of the end stand; and
   at least a first fastener operably coupled to said inner mount and said arm mount, wherein tightening of said at least first fastener secures said clamp to the end stand.

3. The conveyor guard of claim 2, wherein said clamp further comprises:
   a second fastener operably coupled to said inner mount and said arm mount, wherein tightening of said second fastener secures said clamp to the end stand, wherein the end stand is disposed between said first and second fasteners.

4. The conveyor guard of claim 2, wherein said first fastener comprises a U-bolt.

5. The conveyor guard of claim 1, wherein said clamp is configured to engage a lower vertically extending portion of the end stand that is located between the base frame and connection of the end stand with the idler roll.

6. The conveyor guard of claim 1, wherein said rail has a circular cross-section, and wherein said rail support comprises a circular opening configured to receive said rail therethrough.

7. The conveyor guard of claim 1, wherein said rail support comprises a rail fastener, wherein adjustment of said rail fastener secures said rail in position relative to said rail support, and wherein said rail support opens upwardly to receive said rail from above said rail support.

8. The conveyor guard of claim 7, wherein said rail fastener comprises a set screw disposed to contact said rail when said rail is supported in said rail support.

9. A conveyor guard supportable on longitudinally spaced-apart first and second end stands of a belt conveyor having a base frame, each end stand supported by and extending from the base frame and supporting at least one idler roll, the conveyor guard comprising:
   a rail, the rail sized to extend at least from the first end stand to the second end stand;
   a first bracket comprising:
      a first rail support configured to support a first portion of said rail;
      a first arm, wherein said first arm is configured to extend generally upwardly and outwardly away from the idler roll such that said rail is positioned above said rail support when said rail support is secured to the end stand; and
      a first mounting end configured to be mounted to the first end stand; and a second bracket comprising:
- a second rail support configured to support a second portion of said rail;
- a second arm; and
- a second mounting end configured to be mounted to the second end stand.

10. The conveyor guard of claim 9, wherein said first mounting end is configured to engage a lower vertically extending portion of the first end stand, and wherein said second mounting end is configured to engage a lower vertically extending portion of the second end stand.

11. The conveyor guard of claim 9, wherein said rail has a circular cross-section, and wherein each of said first and second rail supports comprise a circular opening configured to receive said rail therethrough.

12. The conveyor guard of claim 9, wherein said first rail support comprises a rail fastener, wherein adjustment of said rail fastener secures said rail in position relative to said first rail support.

13. The conveyor guard of claim 12, wherein said rail fastener comprises a set screw disposed to contact said rail when said rail is supported in said first rail support, and wherein said first rail support is upwardly open.

14. The conveyor guard of claim 9, wherein said first mounting end comprises a clamp configured to removably secure said first arm to the end stand.

15. The conveyor guard of claim 9, wherein said first bracket further comprises a first clamp configured be removably mounted to the first end stand, and wherein said second bracket further comprises a second clamp configured be removably mounted to the second end stand.

16. The conveyor guard of claim 9, wherein connection of the arm mount and the first end stand is positioned below connection of the first end stand with the idler roll.

17. A conveyor idler assembly, comprising:
- a base frame;
- an end stand supported by and extending from said base frame;
- at least one idler roll supported on said end stand;
- a longitudinally extending rail;
- a bracket configured to support said rail, said bracket comprising:
  - an arm;
  - a rail support positioned at a first end of said arm; and
  - an arm mount positioned at a second end of said arm; and
- a clamp configured to removably secure said arm to said end stand, wherein said first and second end of said arm are spaced apart such that said arm is configured to extend generally upwardly and outwardly away from the idler roll such that said rail is positioned above said clamp when said clamp is secured to the end stand.

18. The conveyor idler assembly of claim 17, wherein connection of the arm mount and the end stand is positioned below connection of the end stand with the idler roll and above connection of the end stand with the base frame.

19. The conveyor idler assembly of claim 17, wherein said clamp is configured to engage an outer surface of said end stand, and wherein said clamp comprises:
- an inner mount configured to engage an inner surface of the end stand; and
- at least a first fastener operably coupled to said inner mount and said arm mount, wherein tightening of said second fastener secures said clamp to said end stand.

20. The conveyor idler assembly of claim 17, further comprising:
- a retractable idler support slidably mounted to said base frame, the retractable idler support having a first position and a second position, wherein in said first position vertical movement of said retractable idler support relative to said base frame is restricted, wherein in said second position vertical movement of said retractable idler support relative to said base frame is not restricted;
- at least one idler rollingly supported by said retractable idler support;
- a threaded rod rotatably supported by said retractable idler support; and
- a nut, said nut engaged with said threaded rod such that rotation of said threaded rod causes advancement of said threaded rod relative to said nut, wherein rotation of said threaded rod causes movement of said retractable idler support between said first position and second position, wherein in said second position vertical movement of said nut relative to said base frame is not restricted.

* * * * *